US006695618B2

(12) United States Patent  (10) Patent No.: US 6,695,618 B2
Donn  (45) Date of Patent: Feb. 24, 2004

(54) MULTIPLICATION GAME

(76) Inventor: Victor N. Donn, 118 McArthur Dr., Madison, TN (US) 37115

( * ) Notice: Subject to any disclaimer, the term of this patent is extended or adjusted under 35 U.S.C. 154(b) by 0 days.

(21) Appl. No.: 09/904,652

(22) Filed: Jul. 16, 2001

(65) Prior Publication Data

US 2002/0015936 A1 Feb. 7, 2002

Related U.S. Application Data

(60) Provisional application No. 60/222,608, filed on Aug. 2, 2000.

(51) Int. Cl.[7] .............................................. G09B 19/00
(52) U.S. Cl. ........................ 434/209; 434/191; 434/207
(58) Field of Search ................................ 434/188, 191, 434/193, 195, 200, 207, 209

(56) References Cited

U.S. PATENT DOCUMENTS

| 898,587 | A | * | 9/1908 | Matthias | 434/195 |
|---|---|---|---|---|---|
| 1,403,989 | A | * | 1/1922 | Verneau | 434/191 |
| 1,598,450 | A | * | 8/1926 | Ritter | 273/269 |
| 2,585,458 | A | * | 2/1952 | Gordon | 273/126 |
| 3,009,262 | A | | 11/1961 | Moran | |
| 3,224,114 | A | * | 12/1965 | Swanson | 434/188 |
| 3,571,953 | A | | 3/1971 | Hassel, Jr. | |
| 3,935,649 | A | * | 2/1976 | Harte | 434/195 |
| 5,098,301 | A | | 3/1992 | Woods | |
| 5,120,226 | A | * | 6/1992 | Tsai | 434/195 |
| 5,318,447 | A | | 6/1994 | Mooney | |
| 5,560,611 | A | * | 10/1996 | Kim | 273/272 |
| 5,893,718 | A | | 4/1999 | O'Donnell | |
| 6,116,603 | A | * | 9/2000 | Huang | 273/269 |

FOREIGN PATENT DOCUMENTS

| GB | 1377366 | * | 12/1974 | A63F/3/00 |
|---|---|---|---|---|
| GB | 2066547 | * | 7/1981 | G09B/19/02 |

* cited by examiner

Primary Examiner—Derris H. Banks
Assistant Examiner—Kurt Fernstrom
(74) Attorney, Agent, or Firm—Richard C. Litman

(57) ABSTRACT

A multiplication game teaches and enforces basic multiplication tables for players, while providing an enjoyable and competitive activity for the players. The game includes a game board having a rectilinear matrix of playing positions thereon, with at least one peripheral row and one peripheral column including a series of multiplier and multiplicand numbers therealong. A distinct group of playing pieces or tiles is provided to each player. Each group includes a series of numbers comprising the products of the multipliers and multiplicands of the peripheral row(s) and column(s) of the board on the first sides thereof, with the opposite sides remaining blank. The tiles are placed with numbered faces down, and drawn randomly in turn by the players who place the tiles face up on an appropriate position on the board as defined by the multiplier and multiplicand row(s) and column(s).

17 Claims, 12 Drawing Sheets

MULTIPLICATION GAME

CROSS-REFERENCE-TO RELATED APPLICATION

This application claims the benefit of U.S. Provisional Patent Application Serial No. 60/222,608, filed Aug. 2, 2000.

BACKGROUND OF THE INVENTION

1. Field of the Invention

The present invention relates generally to board games, and more specifically to a game for testing the knowledge of multiplication tables by the players. Each player is provided with a distinctly marked series of playing pieces or tiles each having a multiplication product on one side thereof, with the object being to place the tile on the proper location on a board grid having multiplication factors along peripheral rows and columns thereof.

2. Description of the Related Art

Most people agree that learning mathematics, and particularly basic arithmetic, requires relatively difficult mental effort and is not a particularly enjoyable activity. This is particularly true of rote memory exercises, such as learning the basic multiplication tables. While the development of electronic calculators has greatly simplified such work, the fact remains that the ability to manipulate numbers, and especially to multiply at least single digit numbers together in one's head, is an essential skill in the modern world.

While certain gifted teachers and instructors, and certain teaching methods or techniques, can help considerably in overcoming the difficulty in learning the subject, it is nevertheless extremely difficult to make the learning of arithmetic an enjoyable activity. Yet the enjoyment of games, particularly board games of various types, is nearly universal. Accordingly, some effort has been made in the past to develop a board game or the like involving arithmetic and/or mathematics, which game may be used to teach the subject while enjoying the game. Most such efforts are no more than a mechanized means of teaching the subject, and are not particularly enjoyable or competitive.

Accordingly, a need will be seen for a board game for teaching basic multiplication skills. The present game includes a board having rank and file peripheries with multipliers and multiplicands extending along each row and column of the board. A series of groups of playing pieces or tiles are provided to each player, with the groups differentiated for each player. Players draw tiles in turn and place them on the board at the intersection of the row and column defined by a multiplier and multiplicand for the product number of the tile. The present game lends itself to numerous variations, such as randomizing the row and column multipliers and multiplicands, placing different multipliers and multiplicands on opposite row and column peripheries, timed play, etc.

A discussion of the related art of which the present inventor is aware, and its differences and distinctions from the present invention, is provided below.

U.S. Pat. No. 3,009,262 issued on Nov. 21, 1961 to Edward J. Moran, titled "Educational Toy For Teaching Multiplication Table," describes a board having an array of sequential numbers along two adjoining edges thereof, with orthogonally disposed rods extending across the board. A light is provided at the intersection of the rods, with the light illuminating indicators at one end of each rod. The rods may be positioned rectilinearly across the board, with their ends indicating (and the light illuminating) a multiplier and multiplicand for the product over which the intersection of the rods (and the light) is positioned. While the Moran device may be used to teach multiplication, Moran does not provide any means to use his apparatus as a competitive game, as provided by the present invention.

U.S. Pat. No. 3,571,953 issued on Mar. 23, 1971 to Frank S. Hassell, Jr., titled "Multiplication Game," describes a yardstick type device with a series of 36 numbers on one side thereof. The opposite side includes various multiplication factors which may be used to arrive at the number directly opposite on the first side. A series of problem and solution tags are provided, with players placing the solution tags over the appropriate problems of the second side of the ruler, or placing the problem tags on the numbers of the first side of the ruler. The yardstick concept is relatively limited in comparison to the present board with its row and column matrix of multiplier products, and Hassell, Jr. does not provide any alternative arrangements for the factors.

U.S. Pat. No. 5,098,301 issued on Mar. 24, 1992 to Kenneth C. Woods, titled "Multiplication Facts Learning Aid," describes a system with manuals, booklets, worksheets, etc., for assisting persons in learning the basic multiplication tables. The heart of the Woods system is a matrix of numbered blocks arrayed in a series of panels, with each panel having a number of blocks equal to a squared number, i. e., one panel comprises a five by five matrix of twenty five blocks, another comprises a seven by seven matrix of forty nine blocks, etc. The panels may be moved to provide better visualization of the quantities involved. However, Woods does not provide any form of competitive game, nor separate playing tiles or pieces for placement on a board, as provided by the present multiplication game invention.

U.S. Pat. No. 5,318,447 issued on Jun. 7, 1994 to Margaret E. Mooney, titled "Multiplication Square Game And Method," describes a traditional board game assembly with a game board having a peripheral playing path. Players alternatingly use a die to determine advance of position markers along the playing path, with each player being required to answer an arithmetic problem posed in each position of the playing path upon which their markers come to rest. Variations provide for the exchange of simulated currency and the chance drawing of various cards providing further instructions, advance or setback during play. The Mooney game bears no resemblance to the present game, with its matrix of positions providing places where players place numbered tiles corresponding to the products of peripheral row and column numbers.

U.S. Pat. No. 5,893,718 issued on Apr. 13, 1999 to Gary O'Donnell, titled "Mathematical Board Game," describes a game closely resembling the well known Scrabble® word game. The O'Donnell game includes a board with a matrix of playing positions thereon and a series of playing tiles each numbered on one face. The tiles are placed face down and drawn randomly to provide a supply for each player. Players then inspect their tiles and alternatingly place two or more tiles in rank and file array on the board to form arithmetic equations, with the appropriate signs being disclosed by the players at the time of forming the equations. The rules of the O'Donnell game are very much like the game of Scrabble, whereas the present game requires players to select their tiles randomly for play and to place their tiles on the board in accordance with the peripheral multipliers and multiplicands of the present game board.

British Patent Publication No. 1,377,366 published on Dec. 11, 1974 to Leslie S. Cockerham, titled "Game Set,"

describes a mathematics game having a board with a twelve by twelve matrix of positions, with each row and column being numbered consecutively according to peripheral numbered rows and columns. A series of playing tiles are provided, but the tiles are numbered on both sides in different colors, rather than being numbered only on a single side, as in the case of the present invention. This requires the tiles to be selected randomly and singly from a container or some means provided so players cannot see the tiles before they are drawn for play, since they are numbered identically on each side. Also, while Cockerham notes that the tiles are numbered "on at least two faces" (page 1, lines 15–16), he does not provide any means of providing numbers on a flat (or round, as he also provides) tile, other than on the two opposite faces. Thus, the Cockerham game is limited to two players, or more generally, to a maximum number of players equal to the number of numbered faces on each tile. The present game has no such restriction, with the number of players being limited only by the number of different colors (or other means of differentiation) provided for the different sets of tiles. Also, Cockerham teaches toward play by only two competing players, as the object of the Cockerham game is for each player to form a path completely across the board, using their numbered playing tiles. Thus, the rules and playing tiles of the Cockerham game are completely different from those of the present multiplication game. In addition, Cockerham does not disclose any means for changing or randomizing the peripheral row and column numbers of the game board, as provided by the present invention.

Finally, British Patent Publication No. 2,066,547 published on Jul. 8, 1981 to Duncan J. McNair, titled "Multiplication Board Game," describes a game in which the board represents essentially half of a numerical matrix defined by a sequential series of numbers multiplied together. The McNair board is arranged with the peripheral column numbers beginning adjacent the highest number in the peripheral row, rather than with the two lowest numbers of the row and column being positioned adjacent one another. A series of point value numbers is also provided along each peripheral row and column. The object of the game is to form a straight line completely across the board, either horizontally or vertically, with such a row or column receiving the point values for that row or column in addition to a score according to the numbers of the playing tiles. Thus, the McNair game more closely resembles the game of Scrabble® and the mathematical board game of the '718 U.S. Patent to O'Donnell, discussed further above, than the present game. The McNair game differs from the present game in the above respects, and also due to the rules of play in which players randomly draw their playing tiles from a common stock and view their drawn tiles before play to determine which of the tiles they wish to play at a given turn. In contrast, the present game provides each player with his/her own supply of tiles, with each player's tiles being differentiated from the tiles of other players (different colors, etc.). Also, McNair does not provide any means of randomizing the multipliers and multiplicands of the numbered row and column of his board, as provided by the present multiplication game invention.

None of the above inventions and patents, taken either singly or in combination, is seen to describe the instant invention as claimed.

SUMMARY OF THE INVENTION

The present invention comprises a multiplication board game for teaching and enforcing basic multiplication tables and factors and simultaneously providing an enjoyable and competitive pastime for players. The present game essentially comprises a game board having a series of numbers along at least one peripheral row and adjacent peripheral column. These numbers serve as multipliers and multiplicands for the game. A number of different players may play the present game with each having his/her own set of game tiles, with the different sets of game tiles being differentiated from one another by some means (color, etc.). Each tile is numbered on one side only with the opposite side remaining blank, with the numbers of each set comprising the products of any two of the multiplier and multiplicand numbers of the peripheral row and column.

The tiles for each player are placed face down and in random order for access by the corresponding player. The object of the game is for players to draw a tile in turn from their supplies, note the number on the previously unexposed side, and place the tile with the number side facing up on a board position corresponding to a multiplier and multiplicand for the product represented by the number of the tile. Score may be based upon adding the exposed numbers of each player's tiles which have been played, or by other variations. The game board may also be modified by randomizing the numbers along adjacent peripheries, and/or randomizing the numbers along each of the four peripheries to add more complexity to the game, if so desired.

Accordingly, it is a principal object of the invention to provide an improved multiplication game for teaching and enforcing basic multiplication tables by means of an enjoyable and competitive game.

It is another object of the invention to provide an improved multiplication game including a game board having multiplication factors disposed along at least two adjacent row and columnar edges thereof, with the board including a matrix of positions defined by the numbers of the peripheral row and column.

It is a further object of the invention to provide an improved multiplication game including a plurality of different groups of playing pieces, with each group corresponding to a different player of the game and being differentiated from every other group.

An additional object of the invention is to provide an improved multiplication game in which the playing pieces are numbered on a first side thereof, with each group containing all of the numbers defined by the multiplier and multiplicand peripheral numbers of the board, and with each piece being blank on its opposite side.

Still another object of the invention is to provide an improved multiplication game in which the peripheral numbers of the board may be randomized along two or more edges of the board, if so desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
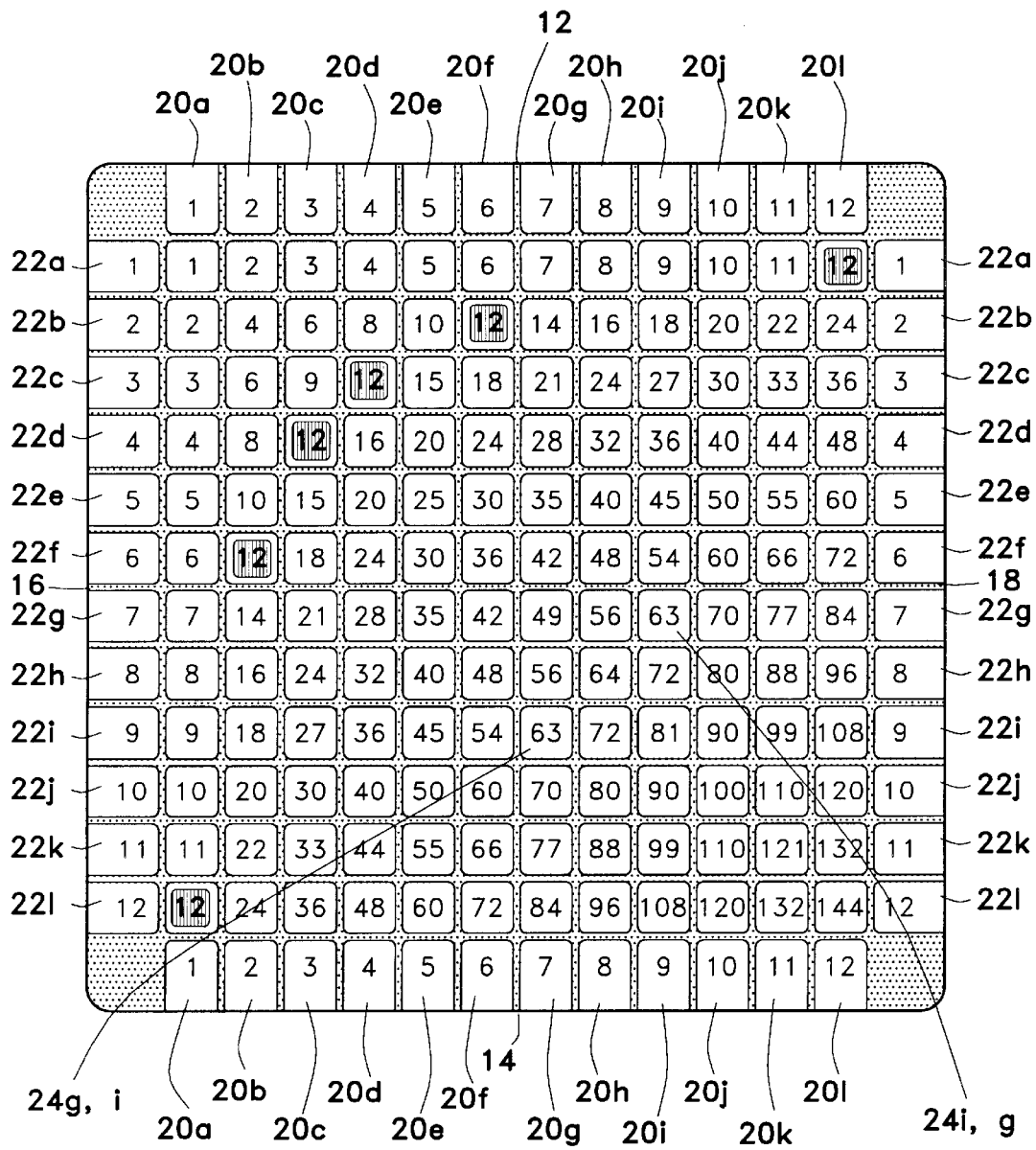
FIG. 1 is a top plan view of an exemplary embodiment of the game board of the present multiplication game, showing its general features.

The present invention comprises a multiplication game, wherein players in turn or simultaneously place numbered tiles on a game board having a matrix of multiplication product positions thereon, with the positions defined by at least one multiplier and at least one multiplicand board edge. An exemplary game board 10 is illustrated in FIG. 1 of the drawings. The game board 10 has a generally square configuration, with each of the four edges 12 through 18 being substantially equal in length to provide an equal number of multiplier and multiplicand positions therealong. The parallel first and second edges 12, 14 form an opposed horizontal row edge pair of multiplication factors, while the parallel third and fourth edges 16, 18 form an opposed vertical columnar edge pair of multiplication factors along the periphery of the board 10.

The multiplication factor numbers (e. g., multiplier numbers 20a through 20l of the horizontal row edges 12 and 14, and multiplicand numbers 22a through 22l of the vertical column edges 16 and 18) define the rectilinear matrix of playing positions 24 extending across the surface of the board 10 between the numbered edges 12 through 14. Each of the playing positions 24 is defined by the corresponding multiplication factors of the appropriate row edge 12 and/or 14 and column edge 16 and/or 20. As an example, multiplier row positions 20i (containing the number nine) and multiplicand columnar positions 22g (containing the number seven) define the playing position 24i,g having the product number sixty three therein.

As the numbered playing positions 24 are products of the multiplier numbers 20a through 20l and multiplicand numbers 22a through 22l, they do not comprise a consecutive series of numbers from one to the highest product, i. e., one hundred forty four. Rather, they comprise all of the non-prime numbers which are products of all multipliers and multiplicands from one to twelve. As prime numbers are not included in this group (excepting numbers multiplied by one), many numbers are repeated, as different multiplication factors can result in the same product (e. g., two times six and four times three both equal twelve, etc.). In the example of the product 24i,g (sixty three) from the multiplier 20i (nine) and multiplicand 22g (seven), it will be seen that using the complementary numbers of the other multiplier and multiplicands, i.e., 20g (seven) and 22i (nine), results in the same product (sixty three), but in a different location 24g,i on the board 10.

While the above described game board 10 is defined by a twelve by twelve series of multipliers and multiplicands 20a through 20l and 22a through 22l, it will be seen that this twelve by twelve matrix is arbitrary, and may be expanded or reduced as desired. Smaller boards, e. g., ten by ten, etc., may be provided, or longer rows and columns of multipliers and multiplicands (e. g., fifteen by fifteen, twenty five by twenty five, etc.) may be provided as desired, with the only practicable limit being the size of the board and the size of each individual row and column position and corresponding playing position on the board.

While all of the product numbers resulting from the multiplication of each of the multipliers 20a through 20l with their corresponding multiplicands 22a through 22l are shown across the playing positions of the board 10 of FIG. 1, it will be seen that such a numbered board 10 would be desirable only in the very earliest training or teaching of multiplication. If such a numbered board 10 were to be used, the present game would be more akin to a numbers matching task, rather than testing any particular knowledge of multiplication. Accordingly, other boards illustrated in FIGS. 2 through 4F do not provide product numbers on their respective product squares or positions.

Figure 6:
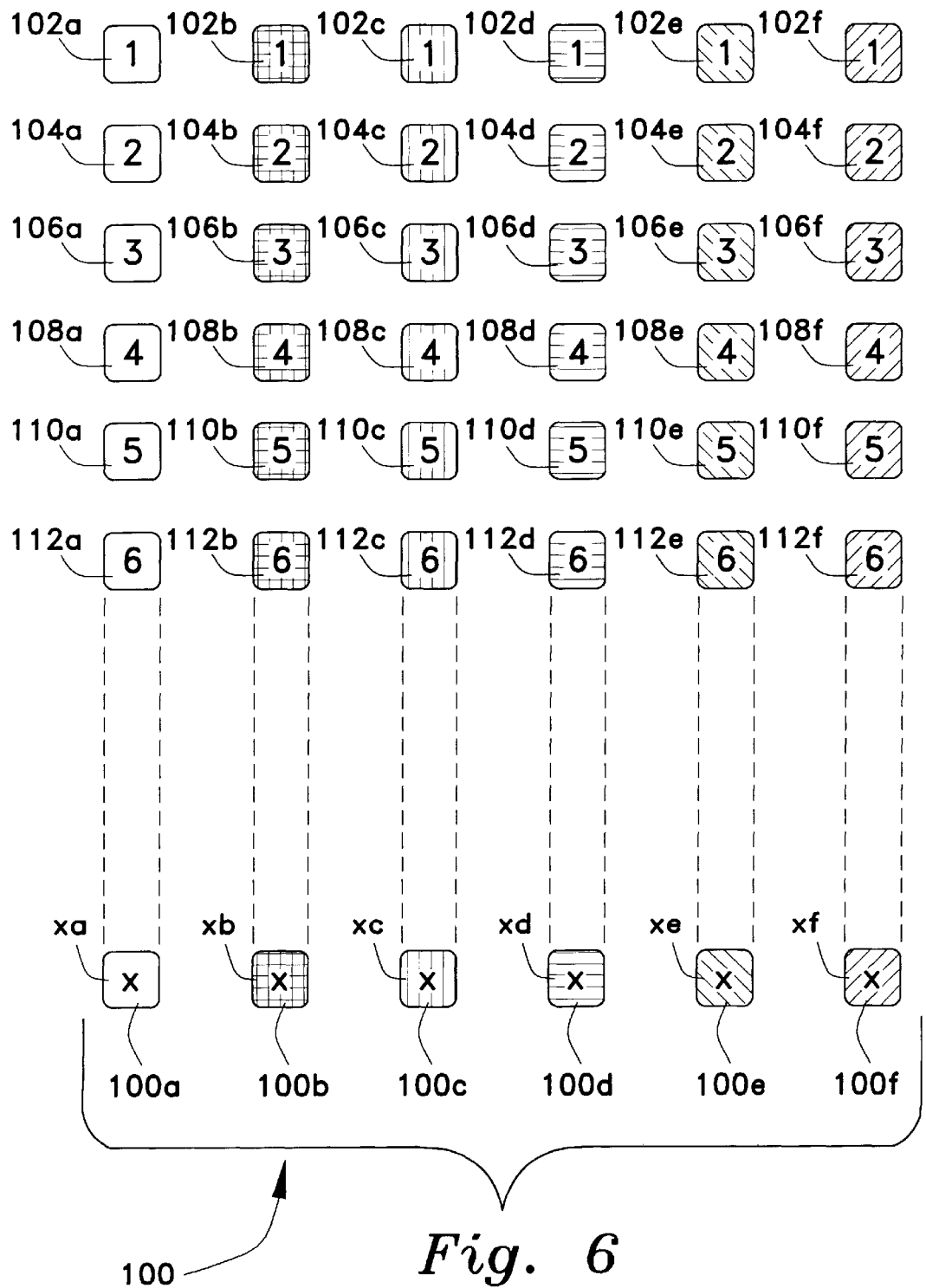
FIG. 6 is a top plan view of an exemplary set of game pieces or tiles, showing the open ended range of numbers which may be used.

A series of playing pieces or tiles is used in the present game, with a set of exemplary tiles 100 being illustrated in FIG. 6 of the drawings. These tiles 100 are divided into groups, e. g., six distinct groups 100a through 10f in FIG. 6. Each player of the present game uses his or her own group during play. Thus, at least two different groups of tiles 100 are provided, allowing play by two players. Additional groups of tiles 100 are preferably provided as desired, and may extend beyond the six groups 100a through 100f illustrated in FIG. 6 if so desired. Each group 100a through 100f (or whatever) contains a series of tiles corresponding to all of the product positions of the corresponding game board, i. e., one hundred and forty four tiles in each group, for a twelve by twelve game board as illustrated herein. More (or fewer) tiles may be provided, corresponding to the quantity of multiplication factor numbers provided on the board.

Each of the groups 100a through 100f is differentiated from one another by some means, so that players may determine which player has played a given number on a given playing position of the board, according to the specific feature(s) of that tile group controlled by that player. The tiles in each group are further numbered, with the tiles of the first group 100a having the numbers one through six thereon, being designated respectively as tiles 102a, 104a, 106a, 108a, 110a, and 112a. Tiles of the remaining groups 100b through 100f are designated correspondingly, as tiles 102b through 112b for the second group, through tiles 102f through 112f for the sixth group 100f. As noted above, there is no maximum number of tiles which may be included within each group, so long as the number of tiles in each group corresponds to the quantity of multiplication product numbers on the board. This is indicated generally in FIG. 6 by the final tiles xa, xb, xc, xd, xe, and xf for the respective groups 100a through 100f, with the tiles xa through xf representing indefinite multiplication product numbers.

Figure 5:
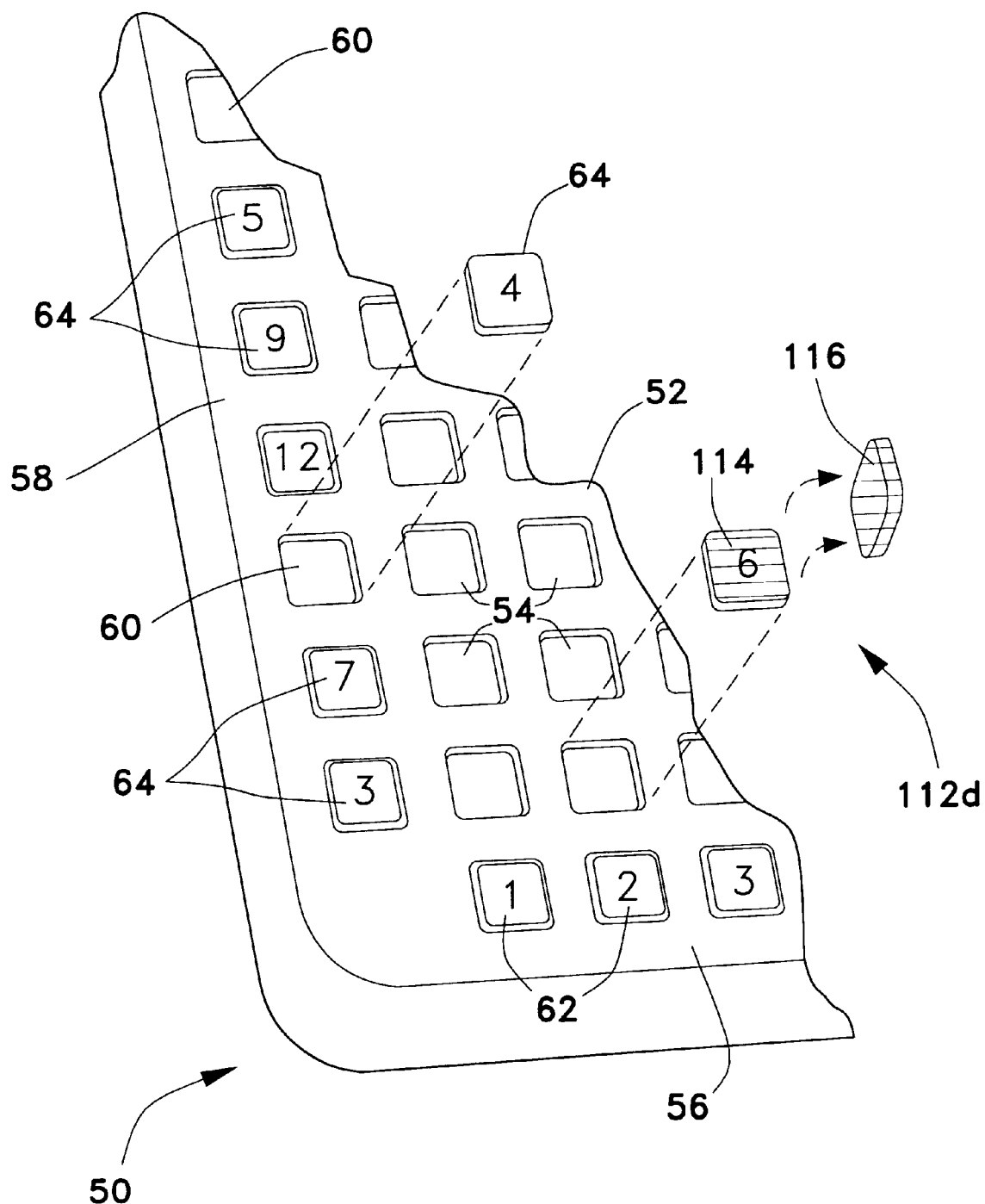
FIG. 5 is a broken away detail perspective view of a game board embodiment of the present game, showing details of a game piece and means for positively retaining the pieces on the board.

An exemplary tile 112d is illustrated in FIG. 5 of the drawings. The various tiles 100 of the present game are preferably relatively flat, with a first side or face 114 having a multiplication product number thereon (e. g., the "6", disposed upon the first face 114 of the tile 112d) and an opposite unnumbered second side or face 116. This provides for all of the tiles 100 to be placed with the first face 114 facing downwardly on a surface, for drawing the tiles 100 randomly during the course of play of the game.

In the example of FIG. 6, the different tile groups are differentiated on at least one side or face (and preferably both) by color, with the tile group 100a being white, the second group 100b being yellow, and the third through sixth groups 100c through 100f respectively being colored red, blue, green, and brown. It will be seen that the above described tile colors for each group are exemplary, and that other colors may be used as desired in addition to or in lieu of the above noted colors. As an alternative, the tiles may be marked in some other manner to differentiate their groups, e. g., by marking the different groups with different geometric symbols or with different numbers of symbols (dots, etc.), as desired. FIG. 5 illustrates the coloring of both sides or faces 114 and 116 of the blue tile 112d to provide differentiation between the tiles of each tile group 10a through 100f.

FIG. 5 also illustrates a small portion of an alternative game board configuration, designated as game board 50. The board 50 has a basic configuration similar to that of the board 10 of FIG. 1 and other game board embodiments of the present invention, but it will be noted that the playing position area 52 is provided with a matrix of insets or depressions 54 for removably placing the tiles (e. g., tiles 112d, etc.) therein. The edges of the board 50 (e. g., the illustrated lower and left edges 56 and 58) are also provided with a like series of depressions 60, for removably placing a series of peripheral multiplier and multiplicand numbers, respectively 62 and 64, therein.

While the peripheral multiplication factor numbers 20a through 22l of the board 10 are affixed permanently to the board, the removable placement of the factor numbers 62 and 64 within the peripheral insets 60 of the board 50 permits those numbers 62 and 64 to be positioned as desired along the board edges. In FIG. 5, the multiplier numbers 62 along the lower edge 56 of the board 50 are arranged sequentially, in proper numerical order, as are the multiplier and multiplicand numbers 20a through 22l of the board 10 of FIG. 1. However, such a sequential arrangement is not required when the numbers are removable. The numbers may be placed in any order, as shown by the random order of the multiplicand numbers 64 of the board 50 in FIG. 5. Such randomizing of either the multiplier numbers 62 and/or multiplicand numbers 64 along any or all of the peripheral edges of the board, provides an added challenge for more advanced players of the present game.

Figure 2:
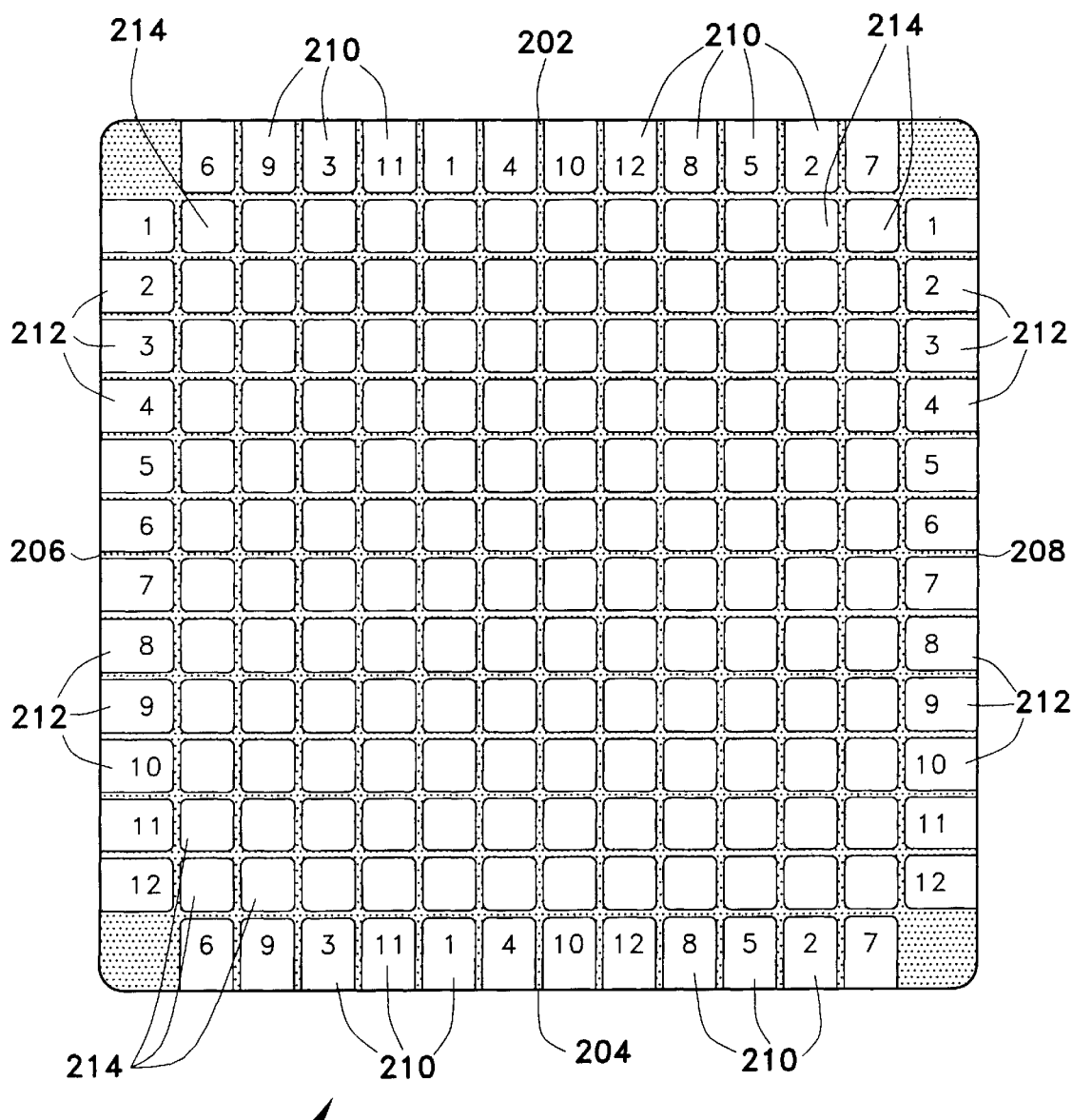
FIG. 2 is a top plan view of a second embodiment of the present game board in which the peripheral row numbers have been randomized, with opposite rows and columns corresponding and with the playing positions of the board remaining blank.

FIG. 2 illustrates a game board 200 in which some of the multiplication factor numbers have been randomized along two of the board edges. The board 200 includes opposed first (top) and second (bottom) row edges, respectively 202 and 204, and opposed first (left) and second (right) columnar edges, respectively 206 and 208. Each row of the horizontal or row edge pair 202, 204 includes a series of multiplier numbers one through twelve therealong, designated generally as multiplier numbers 210. In a like manner, each row of the vertical or columnar edge pair 206, 208 includes a series of multiplicand numbers one through twelve therealong, designated generally as multiplicand numbers 212.

It will be noted that while numbers of the two multiplicand columns 212 are arranged sequentially from top to bottom, that the numbers of the two horizontal multiplier rows 210 are arranged randomly. More precisely, the numbers of a single row (e. g., the numbers 210 of the first or top row 202) are randomized, with the multiplier numbers of the opposite row (e. g., the numbers 210 of the opposite second or bottom row 204) being in identical order to match the randomized top row numbers 210. It will also be noted that the playing positions 214 of the board 200 are blank, thus requiring players to know at least a pair of multiplier and multiplicand numbers which equal each playing tile which they draw. This, along with the matched randomizing of at least one opposed pair of rows or columns, results in a challenging game for players who have begun to master their multiplication tables.

It will be seen that using the removably interchangeable multiplier and multiplicand numbers 62 and 64 with a board configuration like that of the board 50 of FIG. 5, that players may randomize the numbers of any of the row and/or columnar edges of the board as desired. While the board 200 of FIG. 2 illustrates the row pairs 202 and 204 as having the same order, it will be seen that this row pair 202 and 204, and/or the columnar pair 206, 208, may be randomized differently from one another, so that the two opposed edges 202, 204 and/or 206, 208 have different numerical orders from one another. FIGS. 4A through 4F illustrate such a board configuration, and will be discussed further below.

Figure 3:
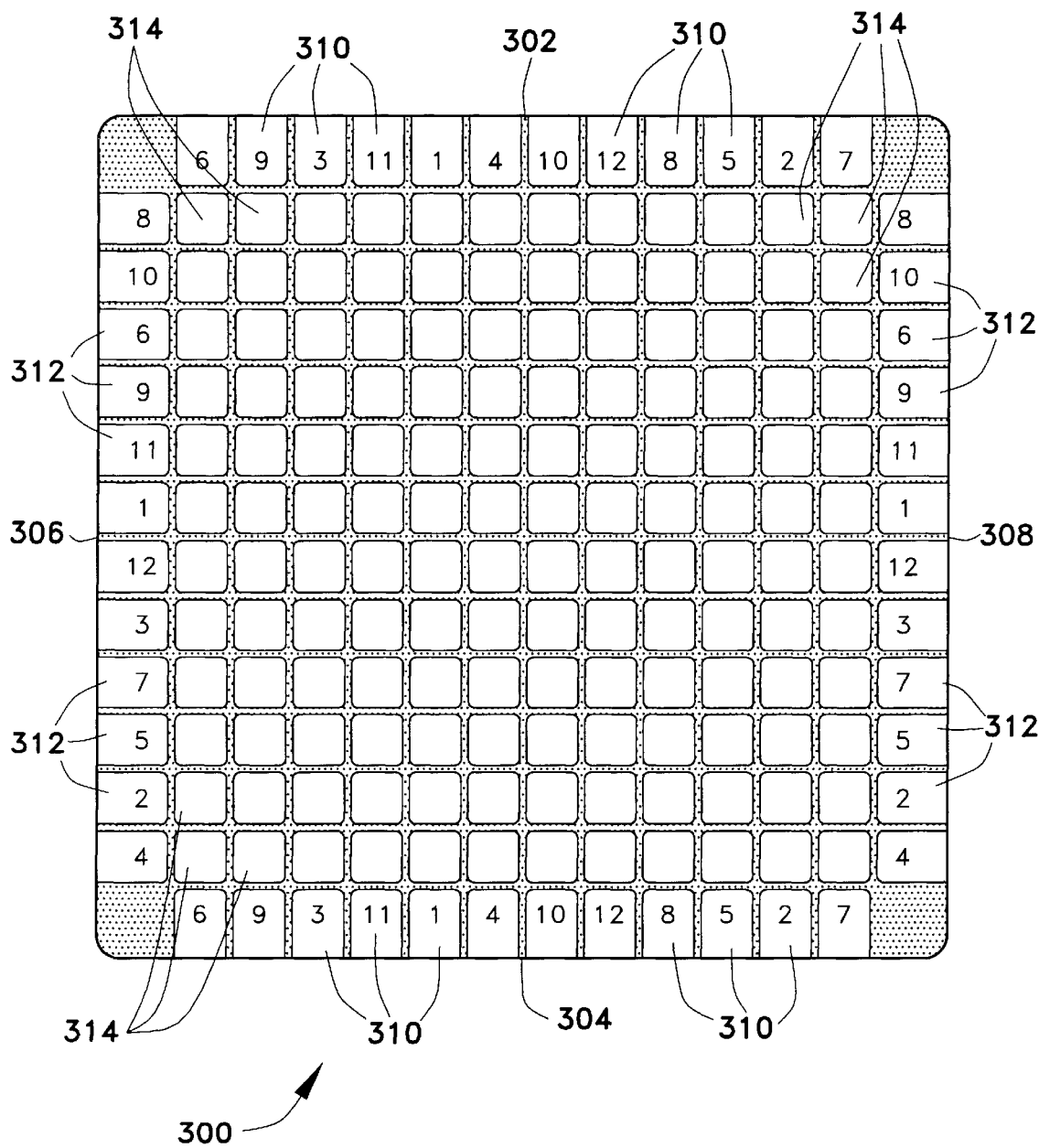
FIG. 3 is a top plan view of a third embodiment of the present game board in which both the row and columnar peripheral numbers have been randomized, with opposite rows and columns corresponding.

FIG. 3 illustrates a further variation on the present game invention, in which each peripheral row and columnar edge of the board 300 has been randomized, or more precisely, one row and one column have been randomized, with opposed row and columnar pairs being identically ordered. The board 300 includes opposed first (top) and second (bottom) row edges, respectively 302 and 304, and opposed first (left) and second (right) column edges, respectively 306 and 308. Each row of the horizontal or row edge pair 302, 304 includes a series of multiplier numbers one through twelve therealong, designated generally as multiplier numbers 310. In a like manner, each row of the vertical or columnar edge pair 306, 308 includes a series of multiplicand numbers one through twelve therealong, designated generally as multiplicand numbers 312.

The board 300 differs from the board 200 in that the both the horizontal multiplier number row pair 302, 304 and the vertical multiplicand number row pair 306, 308 are randomized, or rather, the numbers of one row and one column are randomized, with the corresponding numbers of each opposite row and column each having identical orders to the randomized row and column. As in the case of the board 200 of FIG. 2, the playing positions 314 of the board 300 remain blank, in order to test the multiplication skills of the players. The board 300 may be identical to an entire board represented by the board portion 50 of FIG. 5, the factors along the row and column edges 302 through 308 being interchangeable as desired to vary the numerical arrangement and resulting positions of the multiplication product tiles 100 played thereon.

FIGS. 4A through 4F illustrate another board embodiment, designated as board 400. As in the other board embodiments described above, the precise numerical arrangement of the board 400 may be accomplished using a board constructed in accordance with the board portion 50 of FIG. 5, with the only difference being the randomly placed order of the multiplier and multiplicand numbers while setting up the game. The board 400 of FIGS. 4A through 4F includes opposed first (top) and second (bottom) row edges, respectively 402 and 404, and opposed first (left) and second (right) columnar edges, respectively 406 and 408.

The board 400 differs from the arrangement of the other boards discussed to this point in that each of the row and column number sets is randomly arranged, with the order of each number set differing from every other number set. In FIGS. 4A through 4F, the first or top row 402 contains a set of twelve randomized numbers 410a through 410l; the second or bottom row 404 contains an identical quantity of randomized numbers 412a through 412l; the first or left column 406 contains another set of twelve randomized numbers 414a through 414l; and the second or right column 408 contains another identical quantity of randomized numbers 416a through 416l. Thus, the arrangement of the board 400 differs from that of the other game boards 10, 200, and 300 discussed further above in that every row and columnar edge is randomized, and the order of each randomized set of numbers differs from every other randomized set.

Figure 4A:
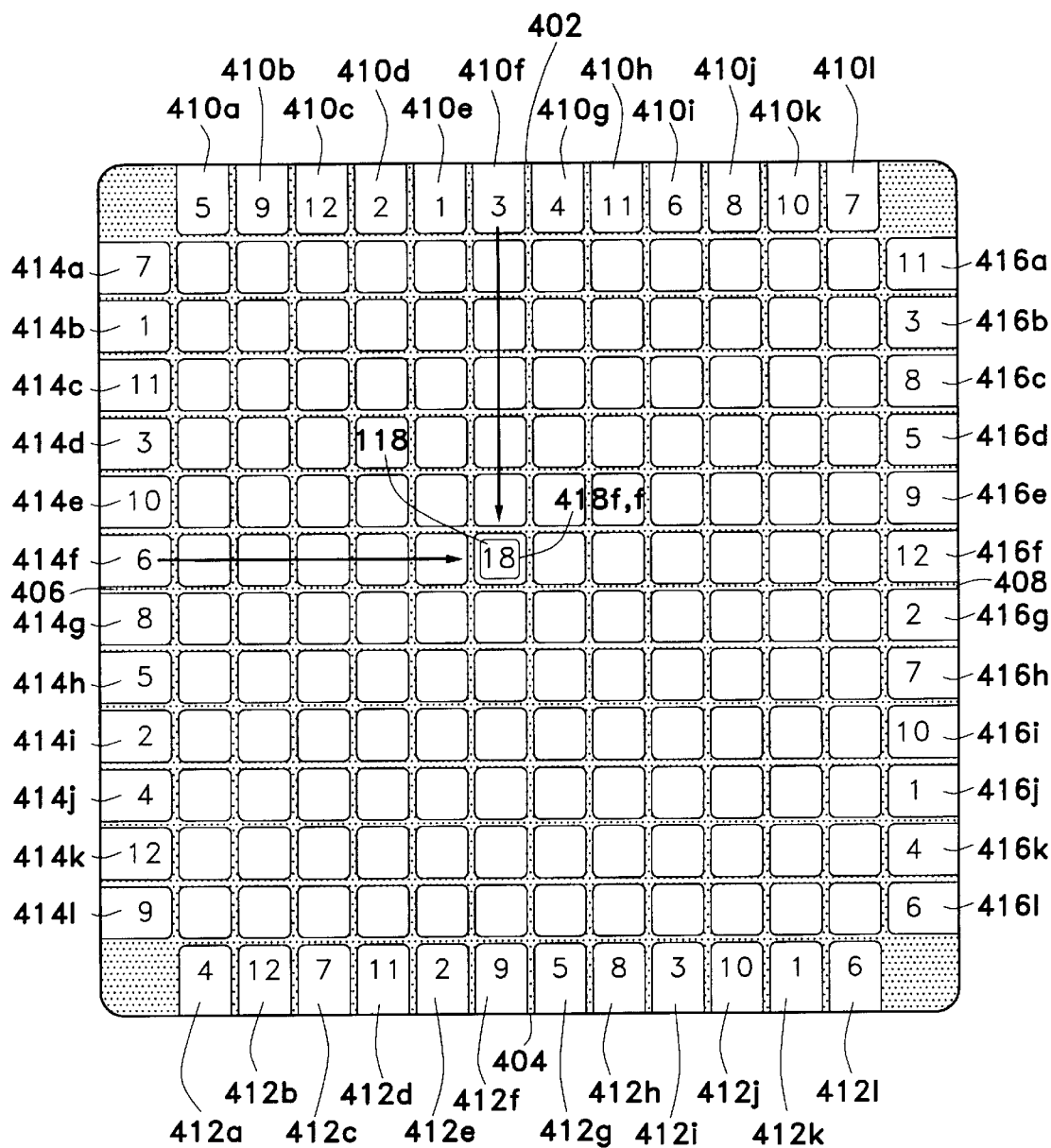
FIG. 4A is a top plan view of a fourth embodiment of the present game board in which all of the row and columnar peripheral numbers have been randomized differently from each other, showing an exemplary placement of a playing tile or piece.

The board 400 of FIGS. 4A through 4F also illustrates the basic rule or principle of play of the present multiplication game. In FIG. 4A, a game tile 118 having a multiplier product of eighteen has been played. This product is the result of multiplying the multiplier (three) of the upper or first row position 410f with the multiplicand (six) of the first or left side column position 414f, resulting in the correct placement of the eighteen tile 118 on the position 418f,f where the column defined by the first row multiplier number 410f and the row defined by the first column multiplicand number 414f intersect. (While the term "multiplier" has generally been used for those numbers in the upper and lower rows and the term "multiplicand" has been used for numbers of the left and right columns of the various embodiments of the present game board, it will be seen that the use of these terms to indicate numbers in a vertical or horizontal array is arbitrary, and that they may be used with equal accuracy to describe either vertically or horizontally arrayed numbers.)

The present game is essentially played in the manner described above, by placing tiles having some multiplication product thereon at the intersection of the multiplier and multiplicand number column and row. However, it will be seen that by randomizing all of the row and column factors differently from one another, that there are several different positions on the board 400 upon which any given tile may be played, particularly such a tile 118 having a product of eighteen, which may be arrived at using several different multipliers and multiplicands.

For example, it will be noted that a tile having a value of eighteen may be played upon position 418i,b, defined by position 410i (having a value of six) of the upper row, and position 416b (having a value of six) of the right column. Other possible positions for the tile 418 using the factors three and six are 418i,d (upper row, left column); 418f,l (upper row, right column); 418i,f (bottom row, left column); 418l,d (bottom row, left column); 418i,l (bottom row, right column); and 418l,b (bottom row, right column). It will be seen that there are a total of eight different positions upon which a tile may be placed, using two multiplication factors and all four sides of the board when the factors along each side have been randomized independently. The exemplary tile 118 shown in FIG. 4A has an additional eight potential positions, when the additional factors of nine and two are considered.

Figure 4B:
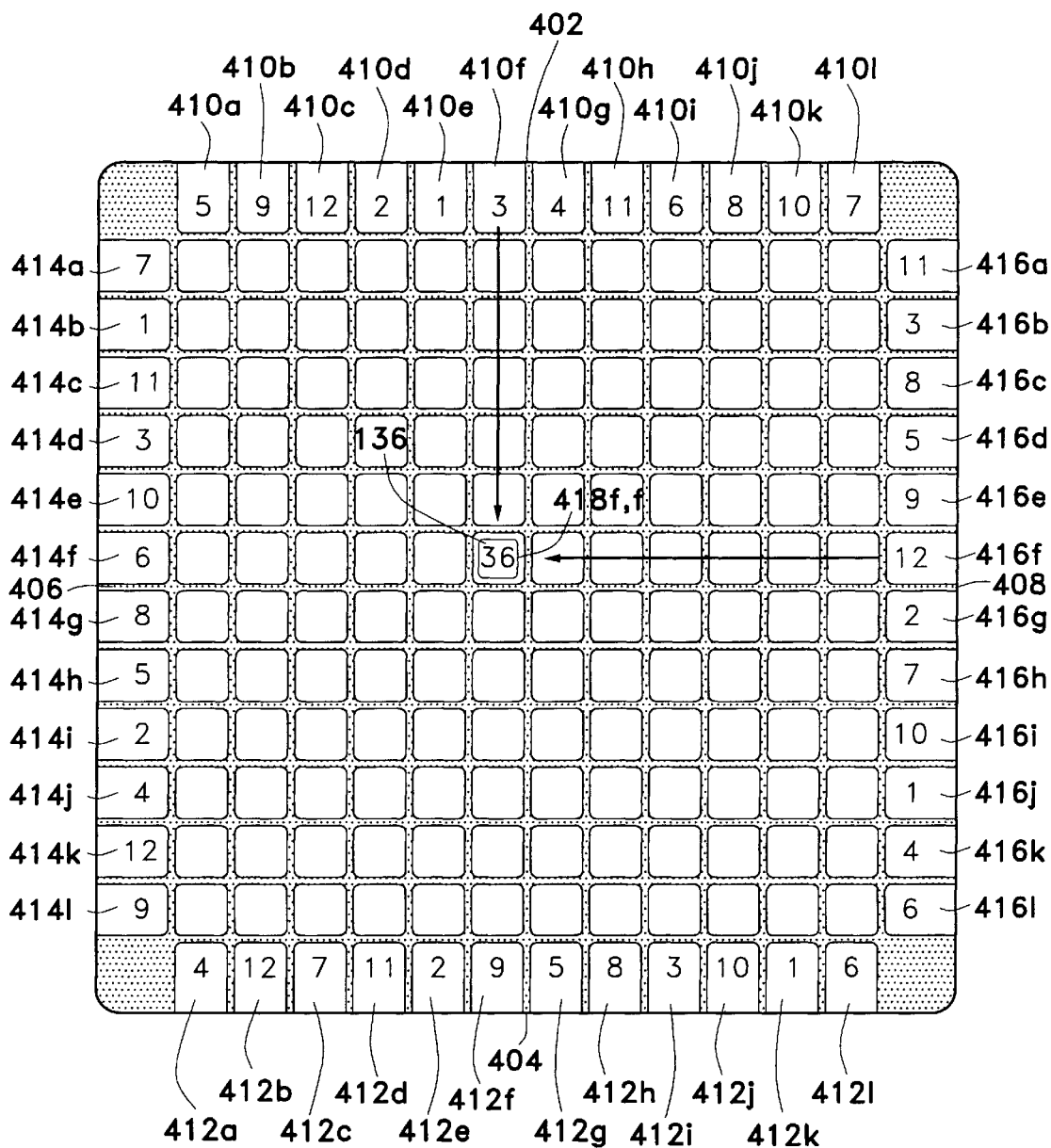
FIG. 4B is a top plan view of the board embodiment of FIG. 4A, showing the exemplary placement of a different tile.

FIG. 4B illustrates an exemplary position 418f,f for a tile 136, having a numerical product of thirty six, on the board 100, based upon the multiplier of position 410f (having a value of three) of the top row 402, and the multiplicand of position 416f (six) of the right side column 408. As noted in the previously discussed example using the tile 118 on the board 400 of FIG. 4A, there are a total of eight different correct positions for the tile 136 based upon the use of only two different multiplication factors. When other factors for the product number thirty six are considered (4×9, 6×6), a total of twenty four different board positions are possible for the single tile 136.

It will be noted that the position 418f,f of the tile 136 is the same position 418f,f upon which the tile 118 (having a product value of eighteen) was played on the board 400 in the example of FIG. 4A. However, this is a proper and correct play for the tile 136, when the multiplier of the top row position 410f (three) and the right side position 416f (twelve) are used, as this multiplier and multiplicand result in a product of thirty six.

Figure 4C:
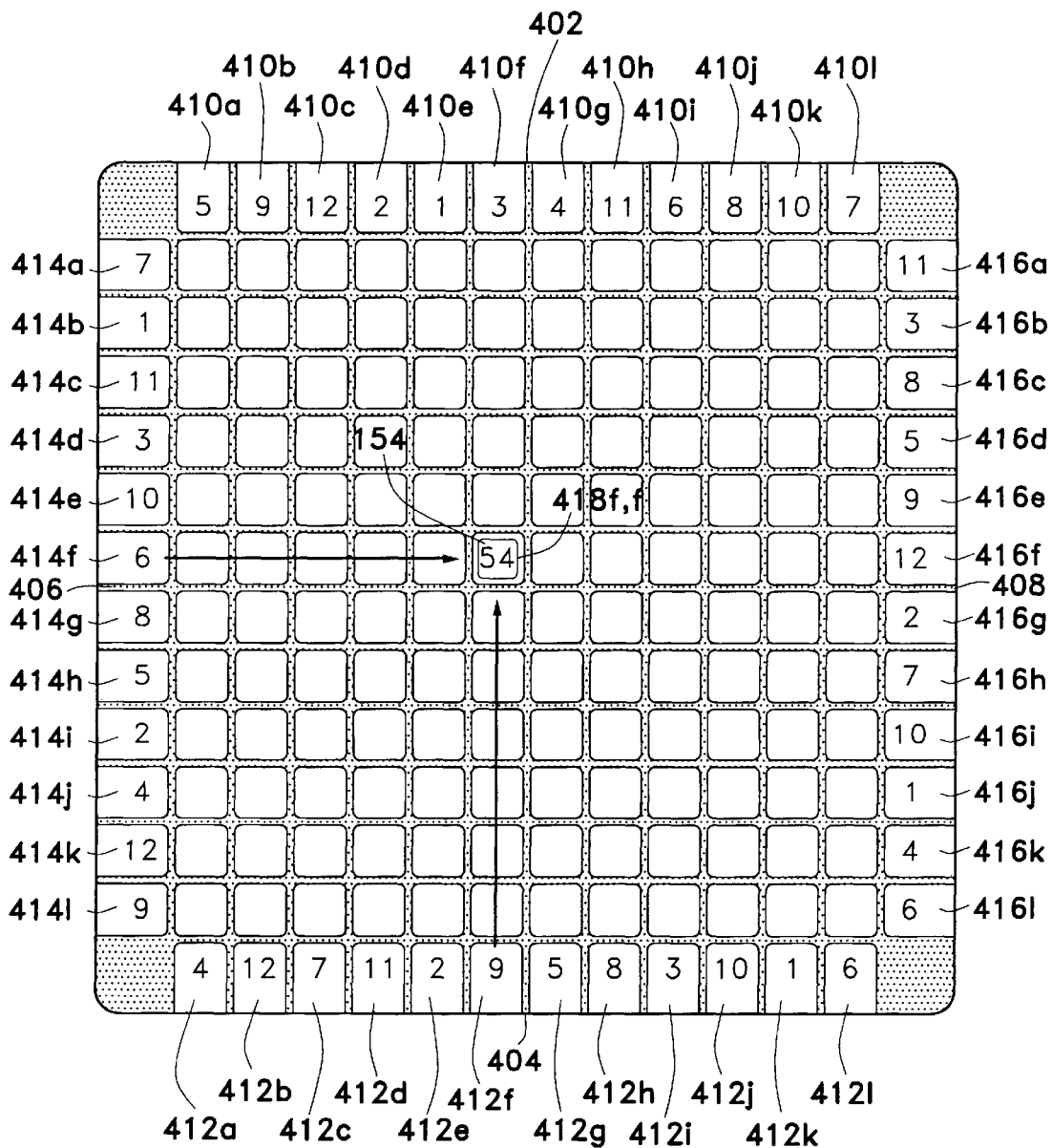
FIG. 4C is a top plan view of the board embodiment of FIG. 4A, showing the exemplary placement of yet another tile.

FIG. 4C illustrates a further example using the same playing position 418f,f as used in the examples of FIGS. 4A and 4B. However, the product value of the tile 154 (fifty four) is different from the tiles 118 and 136 of the earlier examples, due to the use of a different row and column to provide the multiplier and multiplicand factors used in this example. In FIG. 4C, the multiplier (nine) from position 412f of the bottom row 404, is multiplied with the multiplicand (six) from position 414f of the left side column 406 to produce a product of fifty four at position 418f,f. As in the other examples, the tile 154 may be placed correctly at a total of eight different positions for each combination of multiplier and multiplicand factors provided along the board 400 edges. As only two factors (six and nine) are provided on the exemplary board 400, the placement of the tile 154 is limited to these eight positions.

Figure 4D:
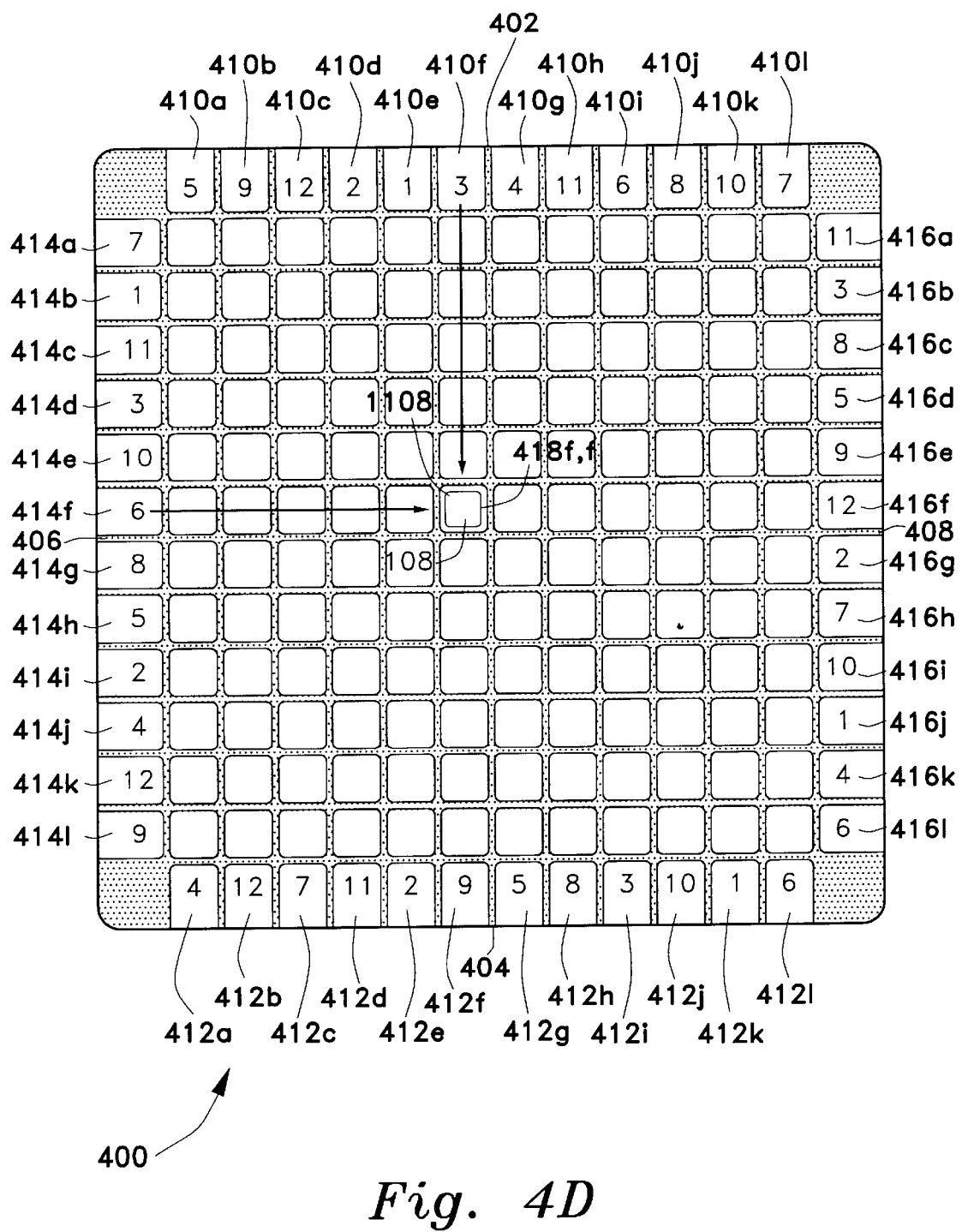
FIG. 4D is a top plan view of the board embodiment of FIG. 4A, showing the exemplary placement of yet another differently numbered tile.

FIG. 4D illustrates yet another example where a tile having a different value from previous examples is played upon the same position 418f,f. In the example of FIG. 4D, a tile 1108 (having a product value of one hundred eight) is played upon the position 418f,f. This is possible by using the multiplier (nine) from the bottom row position 412f and multiplicand (twelve) from the right side row position 416f. The product (one hundred eight) results in placing the tile 1108 of that value at position 418f,f, at the intersection of the column defined by the bottom row position 412f and the row defined by the right side column position 416f. As in other examples, an additional seven positions are possible using the two multiplication factors of twelve and nine, and all of the possible row and column positions where these factors are found.

Figure 4E:
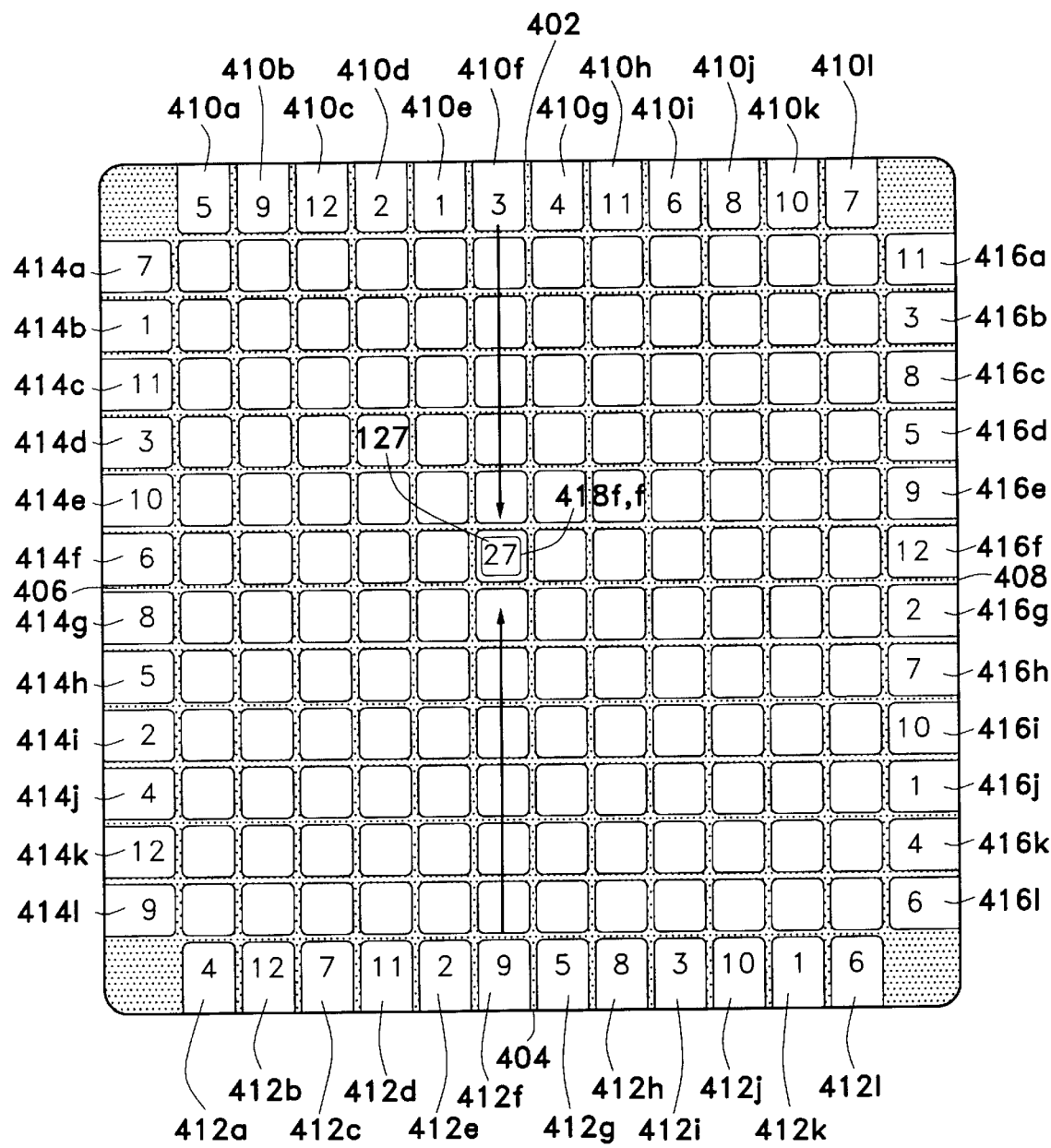
FIG. 4E is a top plan view of the board embodiment of FIG. 4A, showing the exemplary placement of still another differently numbered tile.

A further example is provided in FIG. 4E, where a tile 127 having a value of twenty seven is played at position 418f,f. This multiplication product is a result of multiplying a first multiplier (three) from the first or upper row position 410f with a second multiplier (nine) from the opposite second or lower row position 412f. It will be seen that when such multiplier factors are directly opposite one another on the board, that the tile (e.g. tile 127) may be placed upon any position along the column defined by the two opposite multiplier positions, as desired. This results in a total of twelve different possible positions for the tile, in a board having a twelve by twelve matrix of playing positions.

Figure 4F:
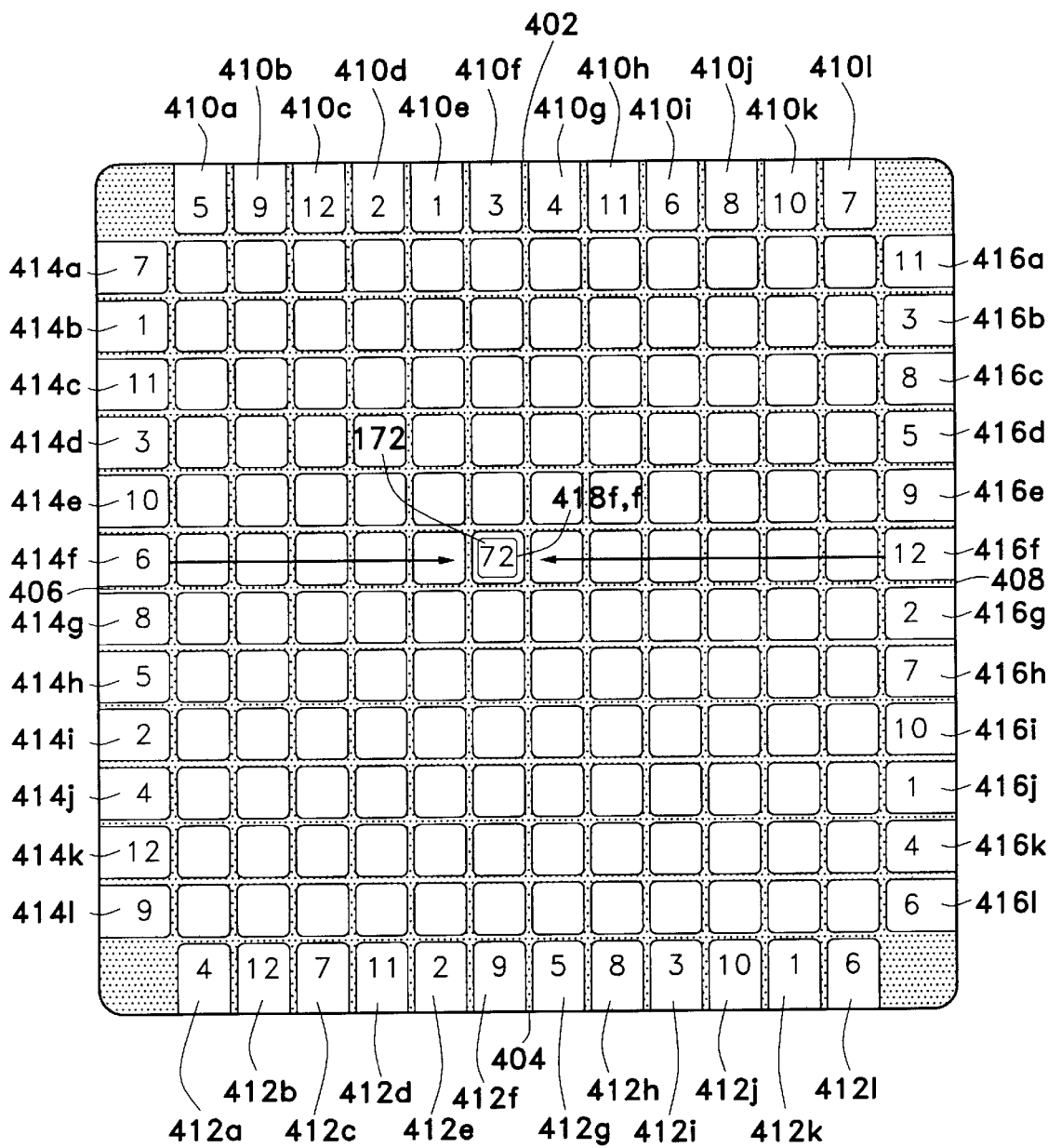
FIG. 4F is a top plan view of the board embodiment of FIG. 4A, showing the exemplary placement of a further differently numbered tile.

FIG. 4F illustrates a final example of tile placement, in which a tile 172 (having a product value of seventy two) is placed upon the board position 418f,f. The two multiplication factors which result in this placement are the first multiplier (six) of the first multiplier column position 414f, and the opposite second multiplier (twelve) of the second multiplier column position 416f. These two opposed positions 414f and 416f define a row extending therebetween, including the board position 418f,f thereon. As in the previous example of FIG. 4E, it will be seen that directly opposite multiplication factors (whether described as multipliers or multiplicands) define an entire row or column of positions equal in number to the number of multiplier or multiplicand positions along the edges of the board. Thus, the playing tile 172 may properly be placed upon any position defined by the two opposed factors 414f and 416f, or a total of twelve different positions.

The relatively wide variety of different playing positions noted in the above described examples opens up many possibilities for players of the present game. It will be noted that if some players have played tiles having identical multiplier product values (but from their respective different groups), that another player is not precluded from successfully playing yet another tile having the same value as those previously played tiles. Also, it will be noted that tiles having different values may be played upon a single playing position when the multipliers and multiplicands are randomized, with the first player to play a tile upon a given position, claiming that position for the duration of the game.

Figure 7:
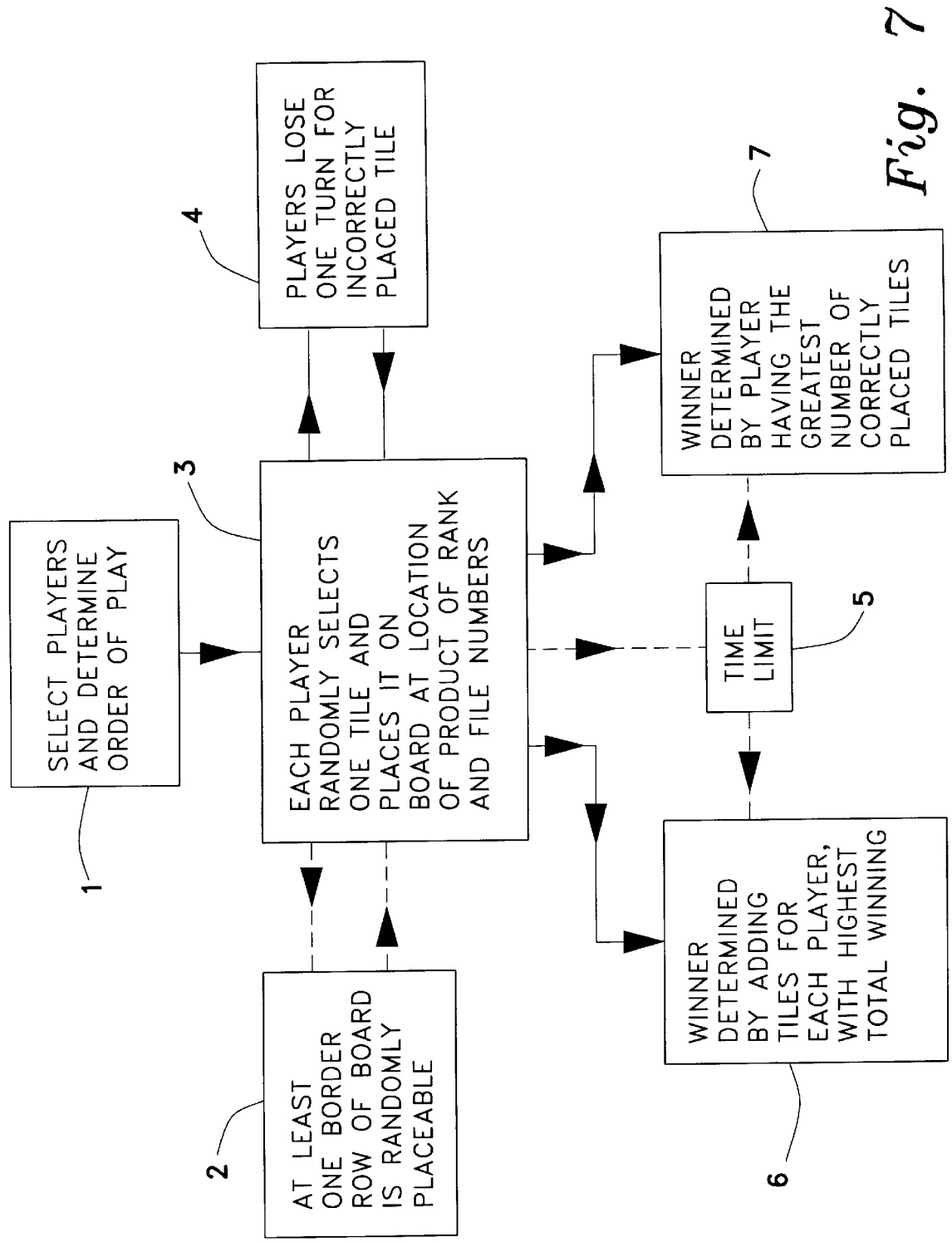
FIG. 7 is a flow chart showing the basic steps involved in the play of the present multiplication game.

FIG. 7 provides a basic flow chart illustrating the basic steps or procedure in the play of the present multiplication game. Initially, the game board is set up, players selected and order of play determined, and the various groups of tiles are distributed to the players, with each player (or perhaps team of players) receiving a single group of tiles. All tiles use in the play of the game are positioned with their numbered first faces facing downwardly, so the numbers are not visible to the players. Only the opposite second faces remain visible, with their color (or other) differentiation indicating which to which group the tiles belong. These various initialization procedures are indicated generally by step 1 of FIG. 7.

In the case of a game board 50 such as that shown partially in FIG. 5, players may randomize the multiplier and multiplicand factors along one or more edges of the board, as desired. This optional step (depending upon the type of board provided with the present game) is indicated as step 2 of FIG. 7.

Play proceeds with the first player in the order of play randomly drawing a playing tile and attempting to place it on one of the correct playing positions on the board, as discussed in detail above. As noted further above, there are several different playing positions which may be possible for correct placement of a given game tile. Even in the case of a board having fixed, sequentially numbered multipliers and multiplicands, such as the board 10 of FIG. 1, there are a total of six different possible correct positions for a tile having a value of twelve, as shown.

Play continues as described above, with players (or teams) each taking a turn in their sequential order of play as determined before the start of the game. This is indicated generally by the central third step 3 of FIG. 7. It will be noted that a tile may be left in position on the board, only in the case of correct placement by the player. Incorrect placement (as noted during the player's turn) results in removal of the tile from the game board. Such an incorrectly played tile may be returned face down to the random collection of tiles for that player or team, or may be placed face up (number showing) in another area, where the value of that tile is subtracted from the score of the player/team which incorrectly played the tile. This is noted in step 4 of FIG. 7. Other rule penalties may be applied for other incorrect play, such as loss of a turn for a player who attempts to play out of turn.

It may be best to establish a time limit for each move or play by each player or team. This may be adjusted according to the skill level of the players or teams involved in the game. A simple kitchen timer, sand glass, etc. may be used for the timing. A period on the order of ten seconds (more or less) may be allotted for each player or team to make a play, with more time being allowed for less skilled players and less time for players or teams having higher skills. Players or teams exceeding the time limit for their turn, forfeit the turn and must wait until their next turn to play. The subject tile may be returned face down to the randomized group, or may be placed face up to count against that player or team at the end of the game, if so desired.

The end of play may be determined in different ways, as decided upon by the players before the beginning of the game. One means of determining the game end, is by setting a time limit for the duration of the game, as indicated by the optional fifth step of FIG. 7. This may be a total time, or timing may be accomplished in the manner used for chess tournaments, in which each player actuates a clock at the end of his/her move, which counts against the opponent. If a player or team runs out of time during the course of play, that player/team is out of the game. Otherwise, a predetermined time period may be set for play. This is valuable in school environments, where certain periods are set for various activities. The teacher may determine that the game will be played for e. g. half an hour or forty five minutes, with the game ending and scores being determined at that point.

Players who cannot make a correct play with a given tile as drawn, lose their turn at that point and must draw another tile at their next turn. Where no time limit is set, play continues until no player (or no more than one remaining player) can make a correct play. The winner of the game may be determined in different ways. One means of determining the winner, is to take all correctly played tiles for each player (i. e., all correctly played tiles of each group) from the board, and add the values of such tiles in each group. The player or team having the group with the highest total, is the winner of the game. This is indicated generally in step 6 of FIG. 7. This method of determining the winner may also be used where a time limit for play is set.

Alternatively, the total number of correctly played tiles in each group may be added, with the player or team having the greatest number of correctly played tiles winning the game, as shown generally in step 7 of FIG. 7. In the case where the total number of correctly played tiles is used to determine the winner, the number of incorrectly played or unplayable tiles (regardless of their collective numerical value) is subtracted from the number of correctly played tiles. Where the total count of all correctly played tiles is used to determine the winner, the total value of any incorrectly played or unplayable tiles is subtracted.

In summary, the present multiplication game provides a pleasant and enjoyable means of learning and reenforcing mental multiplication skills. The present game may comprise any of several different embodiments, where multiplier and multiplicand numbers are sequentially or randomly disposed along one or more row and/or column edges of the board. The randomizing of these numerical factors adds greater challenge and interest to the game. The multiple correct positions provided for most plays, depending upon the number of factors which may comprise the product and the randomizing of the multiplier and multiplicand factors, adds further challenge and interest, with the randomized numbers providing a challenge for more advanced players. It should also be noted that while the drawings of the present disclosure illustrate boards having a twelve by twelve matrix of playing positions and multiplication factors, that these configurations are exemplary of the broader aspects of the invention and that the present invention is not limited to only those dimensions, but may be made in any practicable size as desired. In any event, the present game serves well in simultaneously teaching basic multiplication to players in an enjoyable manner.

It is to be understood that the present invention is not limited to the sole embodiment described above, but encompasses any and all embodiments within the scope of the following claims.

I claim:

1. A multiplication game, comprising:
    a game board having a generally rectilinear matrix of playing positions thereon and first and second edges comprising an opposed row edge pair and third and fourth edges comprising an opposed columnar edge pair;
    at least one set of multiplier numbers disposed along one of said edges of said opposed row edge pair;
    at least one set of multiplicand numbers disposed along one of said edges of said opposed columnar edge pair;
    a first and a second set of multiplier numbers disposed along each of said edges of said opposed row edge pair;
    a first and a second set of multiplicand numbers disposed along each of said edges of said opposed columnar edge pair;
    each said set of multiplier numbers and multiplicand numbers being randomly ordered;
    each said set of multiplier numbers and multiplicand numbers having different orders relative to one another;
    at least a first group and a second group of playing tiles;
    means for differentiating each said group of tiles from one another;
    each of said tiles having a first face and a second face opposite said first face;
    each of said tiles of each said group including a multiplication product number disposed upon said first face thereof, with each said multiplication product number comprising the product of one of said multiplier numbers and one of said multiplicand numbers and with each said group comprising an equal quantity of correspondingly numbered said tiles; and
    each of said tiles further having an unnumbered second face, with each said second face of each said tile being identical to one another within each said group.

2. The multiplication game according to claim 1, wherein said means for differentiating each said group of tiles from one another comprises each of said tiles of each said group having a color disposed upon at least said second face thereof, different from each of said tiles of each other said group.

3. The multiplication game according to claim 1, wherein said multiplier numbers and said multiplicand numbers are permanently positioned along respective said edges of said board.

4. The multiplication game according to claim 1, wherein said multiplier numbers and said multiplicand numbers are removably and interchangeably disposed along respective said edges of said board.

5. The multiplication game according to claim 1, wherein said multiplier numbers and said multiplicand numbers are each sequentially ordered.

6. The multiplication game according to claim 1, wherein at least one said set of multiplier numbers and multiplicand numbers is randomly ordered.

7. The multiplication game according to claim 1, further including:
    a first and a second set of multiplier numbers disposed along each of said edges of said opposed row edge pair;
    a first and a second set of multiplicand numbers disposed along each of said edges of said opposed columnar edge pair;
    one said set of numbers disposed along one of said edges being randomly ordered; and
    said set of numbers disposed opposite said randomly ordered set of numbers having an identical order thereto.

8. The multiplication game according to claim 1, further including:
    a first and a second set of multiplier numbers disposed along each of said edges of said opposed row edge pair;
    a first and a second set of multiplicand numbers disposed along each of said edges of said opposed columnar edge pair;
    two of said sets of numbers disposed along said edges of one said opposed edge pair being randomly ordered; and
    each of said randomly ordered sets of numbers having a different order relative to one another.

9. The multiplication game according to claim 1, further including:
    a first and a second set of multiplier numbers disposed along each of said edges of said opposed row edge pair;
    a first and a second set of multiplicand numbers disposed along each of said edges of said opposed columnar edge pair;
    said first set of multiplier numbers being randomly ordered;
    said first set of multiplicand numbers being randomly ordered;
    said second set of multiplier numbers having an order identical to said first set of multiplier numbers; and
    said second set of multiplicand numbers having an order identical to said first set of multiplicand numbers.

10. A method of playing a multiplication game, comprising the following steps:
    (a) providing a game board having a generally rectilinear matrix of playing positions thereon, an opposed first and second row edge pair, and an opposed first and second columnar edge pair;
    (b) providing at least one set of multiplier numbers and at least one set of multiplicand numbers disposed in at least two adjacent row and column edges of the board;
    (c) providing numbers along both edges of at least one of the row and columnar edge pairs, and randomizing the numbers differently along both edges of the at least one of the row and columnar edge pairs;
    (d) further providing at least two groups of playing tiles, and differentiating the groups from one another;

(e) numbering the tiles of each group with the product numbers of the at least one set of multiplier and at least one set of multiplicand numbers of the row and column edges of the board;

(f) providing means for differentiating the tiles of each group from one another;

(g) determining the end of play of the game and winner determination means;

(h) selecting players;

(i) providing each of the players with a group of numbered tiles;

(j) randomly drawing a tile and noting the number thereon, and placing it with the number thereon exposed on the board in the position defined by the at least one multiplier set and at least one multiplicand set of the edges of the board;

(k) continuing play to the predetermined end of the game; and (l) determining the winner in accordance with the predetermined winner determination means.

11. The method of playing a multiplication game according to claim 10, further including the steps of:

(a) providing each of the tiles with a first face and an opposite second face;

(b) numbering only the first face of each of the tiles;

(c) placing the tiles with their numbered first faces concealed from the players, and randomizing the tiles of each group for each player; and (d) singly and randomly drawing one of the tiles and noting the number on the first face thereof, before placing the tile on the board.

12. The method of playing a multiplication game according to claim 10, wherein the step of providing means for differentiating the tiles of each group from one another further comprises coloring each of the groups differently from one another.

13. The method of playing a multiplication game according to claim 10, further including the step of providing means for interchanging the numbers disposed in at the least two adjacent row and column edges of the board.

14. The method of playing a multiplication game according to claim 10, further including the step of sequentially ordering the numbers of the adjacent row and column edges of the board.

15. The method of playing a multiplication game according to claim 10, further including the step of randomizing the numbers of at least one of the adjacent row and column edges of the board.

16. The method of playing a multiplication game according to claim 10, wherein the step of determining the end of play of the game and winner determination means further comprises:

(a) having all players play sequentially in turn; and (b) adding the numbers of the played tiles of each group, with the highest total number winning.

17. A method of playing a multiplication game, comprising the following steps:

(a) providing a game board having a generally rectilinear matrix of playing positions thereon, an opposed first and second row edge pair, and an opposed first and second columnar edge pair;

(b) providing at least one set of multiplier numbers and at least one set of multiplicand numbers disposed in at least two adjacent row and column edges of the board;

(c) providing numbers along all edges of the board, and randomizing the numbers differently along all edges of the board;

(d) further providing at least two groups of playing tiles, and differentiating the groups from one another;

(e) numbering the tiles of each group with the product numbers of the at least one set of multiplier and at least one set of multiplicand numbers of the row and column edges of the board;

(f) providing means for differentiating the tiles of each group from one another;

(g) determining the end of play of the game and winner determination means;

(h) selecting players;

(i) providing each of the players with a group of numbered tiles;

(j) randomly drawing a tile and noting the number thereon, and placing it with the number thereon exposed on the board in the position defined by the at least one multiplier set and at least one multiplicand set of the edges of the board;

(k) continuing play to the predetermined end of the game; and (l) determining the winner in accordance with the predetermined winner determination means.

* * * * *